Jan. 23, 1968

A. F. A. BARTELS 3,364,517

PROCESSING OF FISH

Filed Dec. 17, 1965

INVENTOR
ALFRED F. A. BARTELS

BY Richards & Geier

ATTORNEYS

United States Patent Office 3,364,517
Patented Jan. 23, 1968

3,364,517
PROCESSING OF FISH
Alfred Friedrich Adolf Bartels, Lubeck-Israelsdorf, Germany, assignor to Nordischer Maschinenbau Rud. Baader, Lubeck, Germany
Filed Dec. 17, 1965, Ser. No. 514,514
4 Claims. (Cl. 17—45)

This invention relates to methods and apparatus for processing fish particularly cod and fish of similar bone structure such as pollock, haddock, whiting, and Norwegian haddock, (otherwise known as redfish or rosefish). The invention is particularly concerned with the opening of the gill cavity and the cutting of the gullet by mechanical means.

In general on board trawlers the opening of the gill cavity and the severing of the gullet of the fish immediately after the catch is brought aboard in order to drain the blood has been performed manually. For example the jaws of the fish are grasped with the left hand and held closed whilst the fish is placed belly upwards and a knife is then employed to cut into the fish to sever the connection between the collar bones and the lower maxilla and this cut is then extended along the collar bones as far as the spinal column at the same time severing the gullet.

One of the principal objects of the present invention is to provide a simple, yet effective and economical mechanical method and apparatus for carrying out these previous manual operations.

According to one aspect of the present invention a method of processing fish includes the steps of piercing the fish with a piercing tool and a first cutting tool between the rearmost gill arch and the collar bones but below the gullet, thereafter moving the first cutting tool away from the gullet to cut the skin between the rearmost gill arch and the collar bones and also to sever the lower maxilla from the collar bones, and making a cut in the opposite direction towards the spinal column in order to sever the gullet with a second tool which passes through the cut already made. Preferably the fish is suspended by the piercing tool whilst the cuts by the first and second cutting tools are made.

According to another aspect of the present invention a fish processing apparatus includes a piercing tool, and a first cutting tool arranged to pierce a fish between the rearmost gill arch and the collar bones but below the gullet, the first cutting tool being movable to cut the skin between the rearmost gill arch and the collar bones and also to sever the lower maxilla from the collar bones, and a second cutting tool capable of passing through the cut already made and thereafter making a cut towards the spinal column to sever the gullet.

The invention may be carried into practice in a number of ways but one specific embodiment will now be described by way of example with reference to the accompanying drawings in which.

Figure 2:
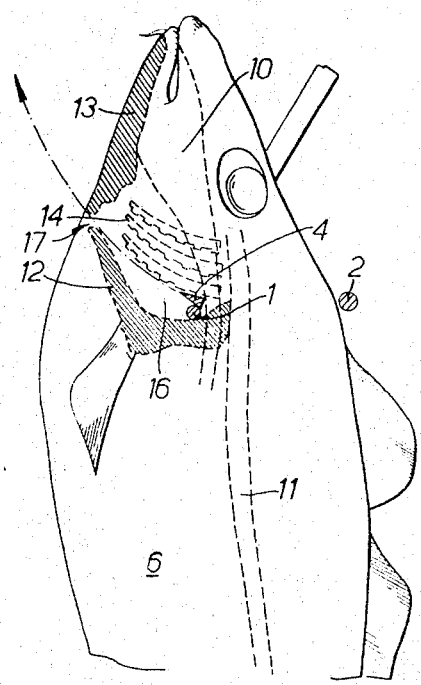
FIGURE 2 is a diagrammatic illustration of a fish showing the relevant parts thereof.

Referring firstly to FIGURE 2, this illustrates, in a very diagrammatic way, the main parts of the fish with which the present invention is concerned. It illustrates the gullet 10 and certain parts of the skeleton of the fish including the spinal column 11 extending downwards from which on each side of the fish is a somewhat arched shaped collar bone 12. The lower ends of the collar bones approach one another on the underside of the fish and are connected by tendons. Further tendons and ligaments connect the collar bones in this region to the lower maxilla 13, the joint 17 between the collar bones and the lower maxilla commonly being called the isthmus. Three gill arches 14 are also diagrammatically illustrated, the gill covers having been removed in FIGURES 2, 3 and 4 for the sake of clarity. It will be seen that there is an area of skin 16 between the rearmost gill arch and the collar bone on each side. It will be appreciated that no particular species of fish is shown and the various anatomical parts illustrated are essentially diagrammatic in order to illustrate the position of the cuts with which the invention is concerned.

Figure 1:
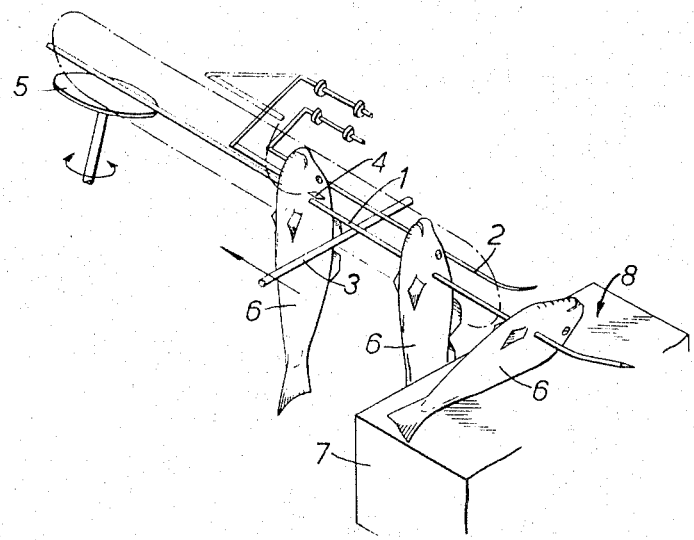
FIGURE 1 is a diagrammatic perspective view of an apparatus for the processing of fish and showing fish at various stages of the method according to the present invention.

Referring now to FIGURE 1 this illustrates a table 8 upon which the fish when caught are lain belly upwards. Associated with this table is an apparatus which includes a spear or piercing tool 1 extending in a horizontal direction away from the table and upon which a fish 6 is illustrated as having been impaled. The point of the spear 1 passes through the fish from one side to the other at a position which is shown in FIGURE 2 i.e. between the rearmost gill arch 14 and the collar bones 12 and just below the gullet 10.

As soon as it is impaled upon the spear 1, the fish is pushed forwards off the table 8 in order that it can swivel about the spear and hang vertically as shown in the second fish position in FIGURE 1, the fish at this time being supported on the spear 1 by the head of the fish. The fish is then carried forwards away from the table 8 by a conveyor which is shown in chain dotted outline and which has a number of transverse members of which one is indicated at 3. At this time the fish is carried past a guide 2 which bears on the head of the fish. In FIGURE 1 a pivotal cutting tool is indicated which is formed with a blade 4, lying parallel to and just above the spear 1.

Figure 3:
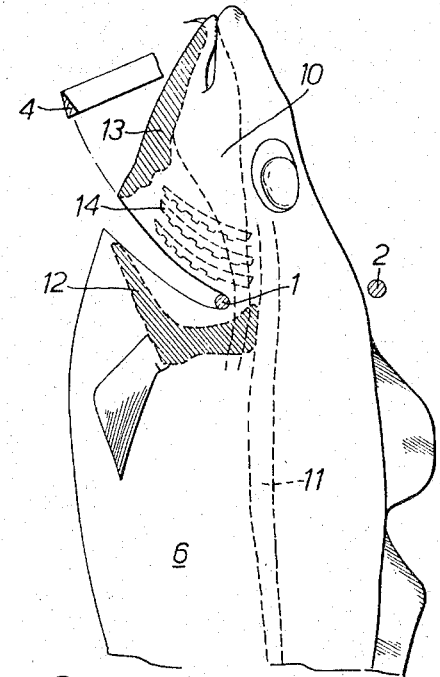
FIGURE 3 illustrates the direction of the first cut.
Figure 4:
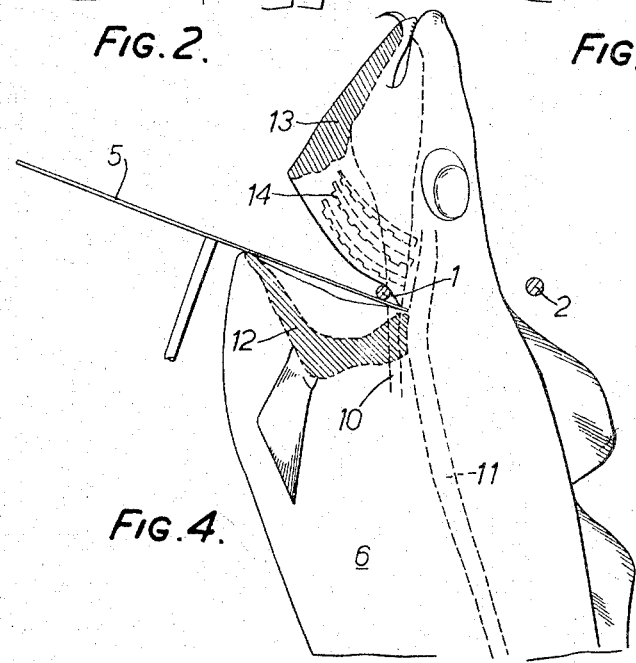
FIGURE 4 is a further diagrammatic view of the fish after the cut of FIGURE 3 has taken place and showing the direction of the second cut.

The conveyor carries the fish along the spear 1 until the fish is also pierced by the blade 4 which as shown in FIGURE 2 passes transversely through the fish just in front of the spear 1. Whilst the fish is being carried forwardly the blade 4 is pivoted upwards as illustrated in the last fish position (to the right) in FIGURE 1 in order to perform a first cutting operation upon the fish. During the piercing of the fish the blade 4 also passes just below the gullet 10 and during its cutting movement does not have to sever the gullet wall. FIGURE 3 illustrates the form of cut which the blade 4 makes through the skin 16 situated between the rearmost gill arch and the collar bones 12. In practice the blade 4 may run along the collar bones, and therefore it is certain to pass through the isthmus 17 between the lower maxilla 13 and the collar bones 12. This joint or isthmus is generally very tough but the positive movement in an outward direction of the blade enables the cutting of it in a simple manner. This form of cut is much simpler than one which is for example attempted by placing a knife on the outer skin of the fish and attempting to cut inwards in this region.

The cut carried out by the blade 4 also passes through the region where the heart of the fish is situated so that bleeding is accelerated and moreover the liver is revealed and can be easily removed in view of the cut taking place in this position. Thereafter the blade 4 pivots clear of the fish and the fish is carried forward to a second cutting tool which is in the form of a rotary disc cutter 5. At this time the body of the fish is twisted by its own gravity relatively to the head of the fish to the position shown in FIGURE 4 whereby the disc cutter 5 can enter the cut made by the blade 4 and perform a cut, in the opposite direction just behind the spear 1, through the gullet 10 and towards the spinal column 11. This second cut completes the cutting operations according to the invention and the fish is carried off the spear 1 by the conveyor.

One reason for the incision of the spear 1 and the blade 4 just below the gullet and the utilisation of two cuts, one being an outward cut by the blade 4 and the other an inward cut by the disc cutter 5 is that the wall of the gullet of a fish of this type consists of very tough skin. If the incision of the spear 1 and the blade 4 were made between the gullet and the spinal column 11 in an attempt to utilize a single cut outwards by the blade 4, the skin of the gullet would tend to give and would not be cut cleanly. A pulling or pushing operation made by the blade 4 would in general not be enough to sever the tough tissue of the gullet. In comparison the use of a rotary cutter running at a relatively high speed has been found to give a very clean cut which is necessary for the removal of the entrails of the fish.

A further advantage of the present invention is that the tips of the gill arches are cleanly severed from the collar bones and the collar bones and other prominent parts of the skull are not damaged in view of the fact that the first cut made by the blade 4 passes through the skin 16.

What I claim as my invention and desire to secure by Letters Patent is:

1. A method of processing fish including the following steps:
   (a) piercing the fish both with a piercing tool and a first cutting tool, such piercing taking place below the gullet and between the rearmost gill arch and the collar bones of the fish;
   (b) thereafter making a first cut by moving the first cutting tool away from the gullet to cut the skin between the rearmost gill arch and the collar bones;
   (c) continuing said first cut also to sever the lower maxilla of the fish from the collar bones, and;
   (d) making a second cut by means of a second cutting tool which passes through said first cut, said second cut being in the opposite direction to that of the first cut and extending towards the spinal column in order to sever the gullet.

2. A method of processing fish including the following steps:
   (a) piercing the fish with a piercing tool;
   (b) suspending the fish on said piercing tool;
   (c) piercing the fish with a first cutting tool whilst the fish is suspended on the piercing tool, the piercing by both the piercing tool and the first cutting tool taking place below the gullet and between the rearmost gill arch and the collar bones of the fish;
   (d) thereafter making a first cut by moving the first cutting tool away from the gullet to cut the skin between the rearmost gill arch and the collar bones;
   (e) continuing said first cut also to sever the lower maxilla of the fish from the collar bones, and;
   (f) making a second cut by means of a second cutting tool which passes through said first cut, said second cut being in the opposite direction to that of the first cut and extending towards the spinal column in order to sever the gullet.

3. A method of processing fish including the following steps:
   (a) piercing the fish whilst in a horizontal position with a piercing tool;
   (b) swivelling the fish about said piercing tool from said horizontal position to a head-upwards vertical position;
   (c) piercing the fish with a first cutting tool whilst the fish is suspended on the piercing tool, the piercing by both the piercing tool and the first cutting tool taking place below the gullet and between the rearmost gill arch and the collar bones of the fish;
   (d) thereafter making a first cut by moving the first cutting tool away from the gullet to cut the skin between the rearmost gill arch and the collar bones;
   (e) continuing said first cut also to sever the lower maxilla of the fish from the collar bones, and
   (f) making a second cut by means of a second cutting tool which passes through said first cut, said second cut being in the opposite direction to that of the first cut and extending towards the spinal column in order to sever the gullet.

4. A method of processing fish including the following steps:
   (a) piercing the fish both with a piercing tool and a first cutting tool mounted for arcuate movement, such piercing taking place below the gullet and between the rearmost gill arch and the collar bones of the fish;
   (b) thereafter making a first cut by arcuately moving the first cutting tool away from the gullet to cut the skin between the rearmost gill arch and the collar bones;
   (c) continuing said first cut also to sever the lower maxilla of the fish from the collar bones;
   (d) acting on said fish to draw apart the parts thereof severed by said first cut, and
   (e) making a second cut by means of a rotary knife which passes through said first cut, said second cut being in the opposite direction to that of the first cut and extending towards the spinal column in order to sever the gullet.

References Cited

UNITED STATES PATENTS 1,604,733  10/1926  Baader _____ 17—3

FOREIGN PATENTS 202,872  8/1923  Great Britain.

LUCIE H. LAUDENSLAGER, *Primary Examiner.*